Figure 3:
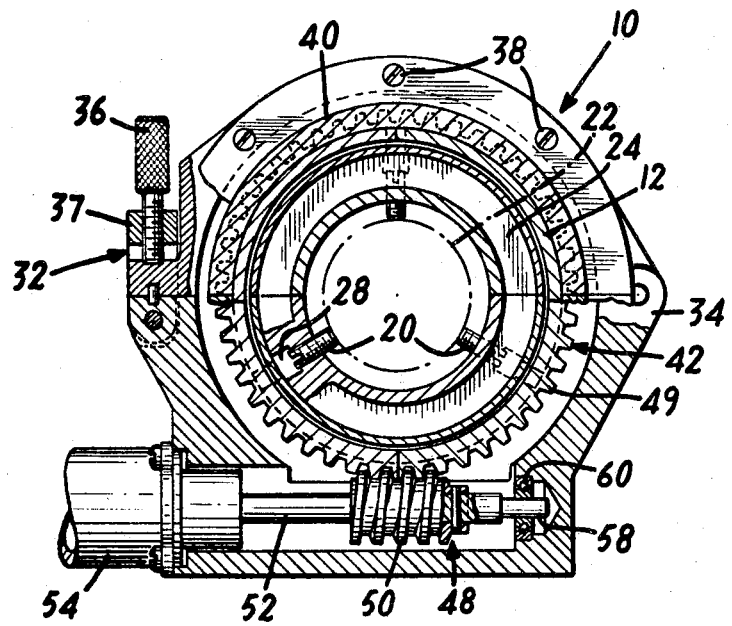

June 25, 1968     T. R. CLAFFEY     3,389,846
AUTOMATIC PIPE WELDER
Filed Nov. 3, 1966     3 Sheets-Sheet 1
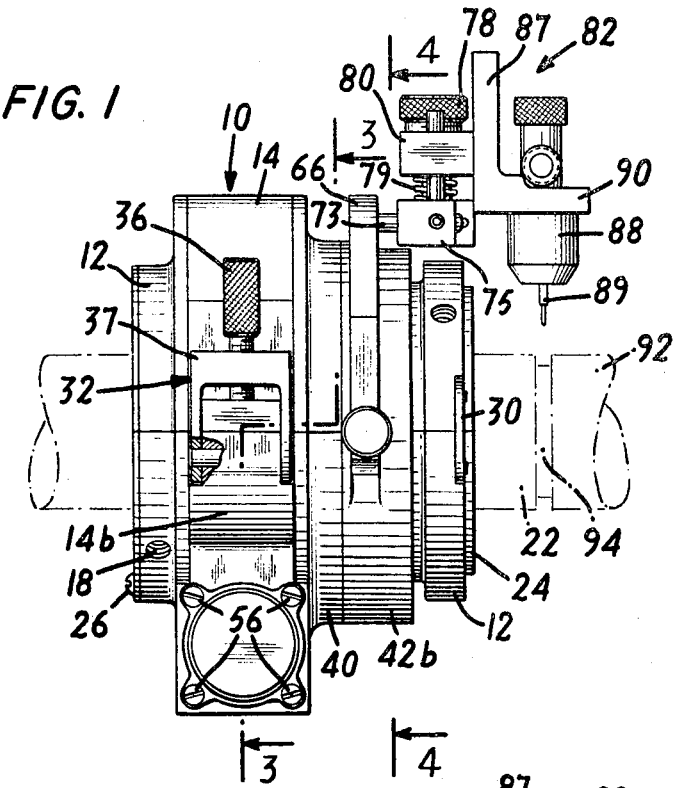
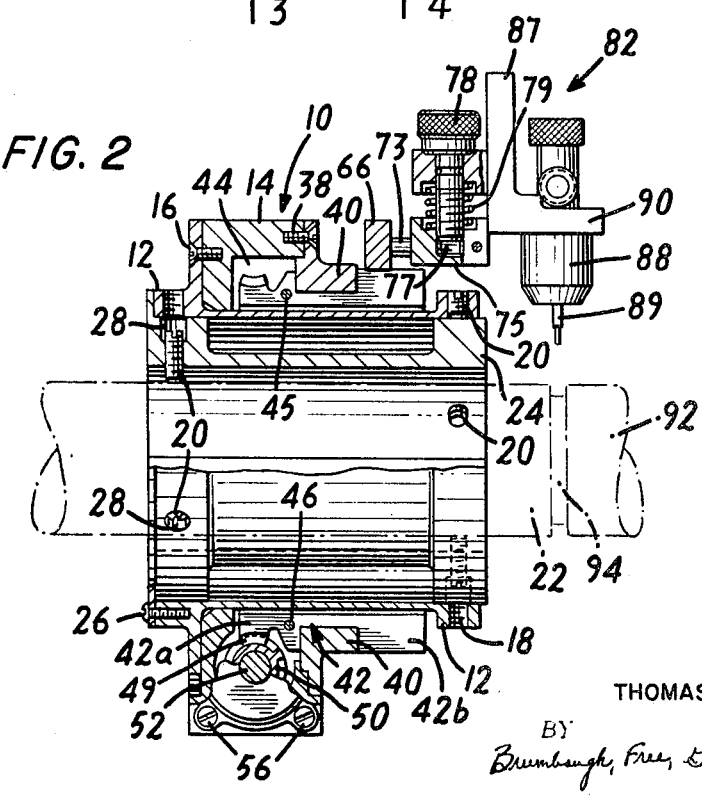
INVENTOR.
THOMAS R. CLAFFEY
BY Brumbaugh, Free, Graves & Donohue
his ATTORNEYS June 25, 1968  T. R. CLAFFEY  3,389,846
AUTOMATIC PIPE WELDER Filed Nov. 3, 1966  3 Sheets-Sheet 2

INVENTOR.
THOMAS R. CLAFFEY
BY
his ATTORNEYS

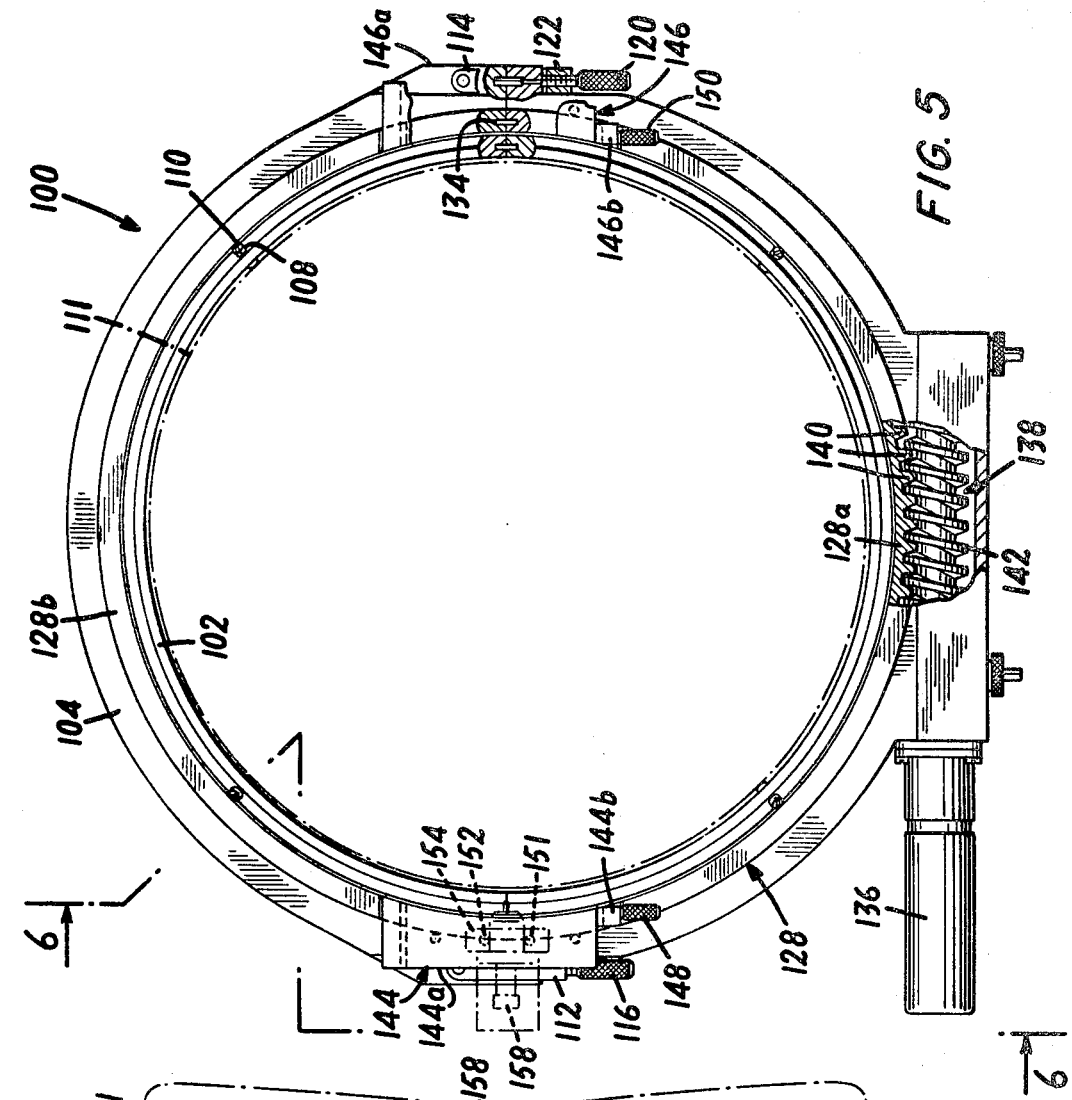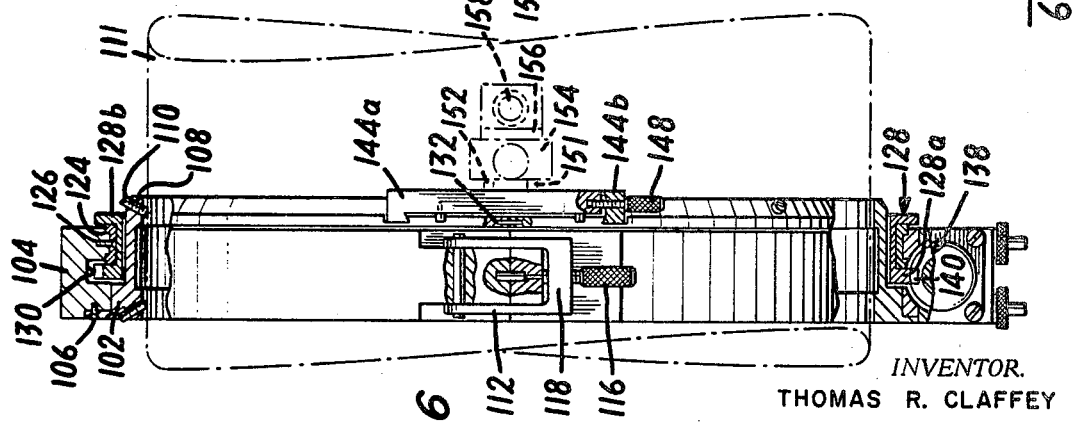

United States Patent Office 3,389,846
Patented June 25, 1968

3,389,846
AUTOMATIC PIPE WELDER
Thomas R. Claffey, Groton, Conn., assignor to General Dynamics Corporation, New York, N.Y., a corporation of Delaware
Filed Nov. 3, 1966, Ser. No. 591,818
10 Claims. (Cl. 228—29)

This invention relates to pipe welding apparatus and, more particularly, to automatic pipe welding apparatus of the split gear type.

In presently devised automatic pipe welders of the split gear type, a welding torch is mounted to a split gear assembly which is driven to rotate about a pipe by a worm or other type gear assembly. While the gear assembly rotates about the pipe, the opposite ends of the split gear assembly tend to separate which, in turn, causes a non-uniform meshing between the teeth of the split gear assembly and the teeth of the driving or worm gear assembly. Although this separation between the opposite ends of the split gear assembly is minimal, the non-uniform meshing between the teeth of the two gear assemblies causes the teeth of the split gear to wear down such that the split gear assembly must be replaced periodically. This, of course, results in inefficiency of operation and increased production costs. A further disadvantage with presently devised automatic pipe welders lies in the fact that the housing of each split gear assembly is suitable for mounting only on pipes having a specific diameter. Accordingly, there is required as many split gear assemblies as there are differently sized pipes. This results in a large inventory and, again, increased production costs.

Accordingly, it is an object of the present invention to provide an automatic pipe welding apparatus which overcomes the above-mentioned disadvantages of presently devised automatic pipe welders.

It is another object of the present invention to provide an automatic pipe welding apparatus which prevents opposite ends of a rotating split gear from separating.

It is still another object of the present invention to provide an automatic pipe welding apparatus which is adapted to accommodate a plurality of differently sized pipes.

These and other objects of the invention are accomplished by providing an automatic pipe welding apparatus which includes a split gear housing having a cavity formed therein and a bottom wall extending beyond the side walls of the housing and adapted to secure the housing to a first pipe. Within the cavity of the housing there is mounted the tooth portion of a split gear assembly, the flange portion of the assembly extending beyond one of the side walls of the housing. In order to secure the opposite ends of the split gear assembly from separating during rotation, a welding torch mounting clamp is provided for mounting on the flange portion of the split gear assembly, the clamp acting to compress both halves of the split gear assembly together. Attached to the mounting clamp is a welding torch assembly which, when the gear assembly is driven to rotate about the bottom wall of the housing, operates to weld the first pipe to a second pipe.

In order to accommodate differently sized pipes, the portion of the bottom wall extending beyond one of the side walls of the housing includes a flange member for threadedly receiving a plurality of adaptor split sleeves. The dimensions of each adaptor split sleeve are chosen to match a pipe having a specific diameter such that any of a plurality of differently sized pipes may be welded by the same pipe welder merely by changing adaptor sleeves.

Figure 4:
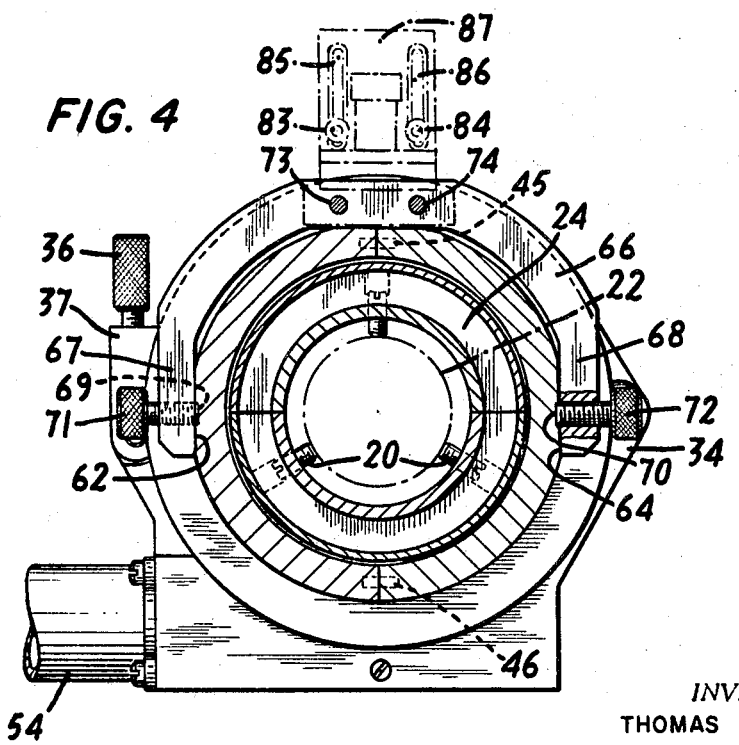

Further objects and advantages of the invention will be apparent from a reading of the following detailed description thereof taken in conjunction with the following drawings, in which:

FIGURE 1 is a side elevational view of one embodiment of the present invention;
FIGURE 2 is a view in longitudinal section of the FIGURE 1 embodiment;
FIGURE 3 is a view in cross section of the FIGURE 1 embodiment taken along lines 3—3 and looking in the direction of the arrows;
FIGURE 4 is still another view in cross section of the FIGURE 1 embodiment taken along lines 4—4;
FIGURE 5 is a front view, partly in cross section, of another embodiment of the present invention; and
FIGURE 6 is a view in cross section of the FIGURE 5 embodiment taken along lines 6—6.

In the illustrative embodiment of the invention, as shown in FIGURES 1-4, a split gear housing 10 is provided which includes a primary adaptor split sleeve 12 extending through the housing 10 and bolted to one edge of a main split clamp 14 by means of a plurality of selectively spaced bolts 16. The adaptor sleeve 12 includes a plurality of selectively spaced openings 18 formed therein for receiving a plurality of set screws 20. The sleeve 12, together with the set screws 20, is adapted to secure the housing 10 to any relatively large sized pipe extending through the housing 10. As best illustrated in FIGURE 2, the split adaptor sleeve 12 which extends through the split gear housing 10 has an inside diameter which is too large to tightly secure the housing 10 to a relatively small sized pipe 22 extending through the housing 10 and being secured from rotational movement by an external element (not shown). It should be understood that the pipe 22 may be secured against rotation in any simple and conventional manner, such as, for example, by means of a vise.

In order to secure the housing 10 to the relatively small sized pipe 22 and in accordance with the invention, a secondary adaptor split sleeve 24 is provided which is threadedly attached to one end surface of the sleeve 12 by a plurality of selectively spaced bolts 26. The secondary split sleeve 24, shown partly in side elevation and partly in cross section in FIGURE 2, includes a plurality of threaded openings 28 formed therein for receiving the set screws 20. It is noticeable that the openings 28 of the secondary adaptor sleeve 24 are angularly aligned with the apertures 18 formed in the primary adaptor split sleeve 12 such that the set screws 20 are threaded through the openings 18 and 28 in split sleeves 12 and 24, respectively, until they tightly engage the pipe 22 to thereby secure the housing 10 to the pipe 22.

In one embodiment of the invention which has been operated successfully, the housing 10 is provided with a primary split sleeve which is adapted to secure the housing 10 to pipes having an outside diameter of five inches. For smaller sized pipes, such as, for example, pipes having outside diameters between four and three-quarter and two and one-half inches, secondary adaptor split sleeves, having dimensions to match these smaller sizes, have been provided. As best shown in FIGURE 1, the split sleeve 12 further includes a latch 30 which is pivotally mounted on the lower edge of the split sleeve 12 and engages a pin member in the upper edge of the split sleeve 12 after the housing has been closed. This is provided to securely clamp opposite edges of the split sleeve 12 together at the right hand end of the housing because the main clamping action is provided closer to the left hand edge of the housing, as will be apparent hereinbelow.

Further included within the housing 10 is a clamping yoke 32 pivotally mounted on the lower edge of the main split clamp 14 for securing one pair of opposite edges of the main split clamp 14 together and a pin member 34 (FIG. 3) attached to the other pair of opposite edges for enabling the housing 10 to open when not secured by the yoke 32. As shown in FIGURE 1, to secure the upper and lower edges of the housing 10, the yoke 32 is pivoted into a vertical position and a thumb screw 36, secured within the upper lateral edge 37 of the yoke 32, is threaded into a matching threaded receptacle in the upper edge or half of the clamp 14. Attached to a side surface of the main split clamp 14 by a plurality of selectively spaced bolts 38 is a bearing guide member 40 which guides a split gear assembly 42 in its rotational movement around the split sleeves 12 and 24. The split gear assembly 42 is shaped such that its gear or tooth portion 42a fits comfortably within a cavity 44 formed in the main body clamp 14 while its skirt or flange portion 42b is shaped to complement the shape of the bearing member 40. Accordingly, the bearing member 40 prevents the gear assembly 42 from moving laterally during its rotation around the sleeves 12 and 24. A pair of dowel assemblies 45 and 46 are further provided in opposite edges of the split gear 42 for accurately aligning both halves of the split gear assembly 42 when the gear assembly is closed.

As best shown in FIGURE 3, the split gear assembly 42 is driven by a worm gear assembly 48, the teeth 49 and 50 of the gear assemblies 42 and 48, respectively, uniformly meshing. The worm gear 48 is supported by a drive shaft 52 which is driven by a globe motor 54 mounted to the lower edge of the main split clamp 14 by four fillister head screws 56. Connected to the other end of the drive shaft 52 is a pin rod 58 which rotates comfortably within a ball bearing 60 mounted in the lower edge of the main body clamp 14.

As best shown in FIGURES 1 and 4 and in accordance with the present invention, the flange portion 42b of the split gear assembly 42 includes a pair of cutout 62 and 64 located on opposite edges of the flange portion 42b and 90° out-of-phase with the plane of the junction between opposite edges of the split gear assembly 42. Fitted around this flange portion 42b of the split gear assembly 42 is a generally C-shaped mounting clamp 66 having a pair of leg members 67 and 68 for removable engagement with the cutouts 62 and 64, respectively. The cutouts 62 and 64 include a pair of threaded receptacles 69 and 70, respectively, the threaded receptacles being exactly 90° out-of-phase with the plane of the junction between opposite edges of the split gear assembly 42. Threadedly maintained within each of the leg members 67 and 68 of the mounting clamp 66 are a pair of thumb screws 71 and 72, respectively, which, when threaded into the receptacles 69 and 70, secure the clamp 66 to the flange portion 42b of the split gear assembly. This has the effect of sealing the opposite edges of the split gear assembly together regardless of any separating forces existing therebetween due to the rotation of the gear assembly. By preventing an even slight separation between the opposite edges of the gear assembly 42, a uniform meshing between the teeth 49 and 50 of the split gear and worm assemblies is assured. This reduces the wearing down of the teeth 49 and, accordingly, increases the operational life of the split gear assembly 42.

Bolted to the upper circular portion of the C-shaped mounting clamp 66 by a pair of bolts 73 and 74 is a generally rectangularly shaped support member 75 having a threaded receptacle 77 formed therein for threadedly receiving a spring biased thumb screw 78. Interposed between the knurled head of the screw 78 and the support member 75 and supported by the spring 79 of the screw 78 is a further support member 80. The member 80 is secured to an L-shaped welding torch bracket 82 by means of vertically adjustable bolts 83 and 84 which are maintained within a pair of vertical cutouts 85 and 86 formed in the longer leg 87 of the bracket 82. A welding torch 88, including an electrode 89, is secured within the shorter leg 90 of the bracket. In order to weld the pipe 22 and a pipe 92 together by welding each pipe to a flange 94 press fitted into adjacent ends of the pipes 22 and 92, the bolts 83 and 84 are loosened and the L-shaped bracket 82 is moved downwardly until the electrode 89 of the welding torch 88 is adjacent the flange 94. Thereupon, the bolts 83 and 84 are tightened and the spring biased thumb screw 78 is adjusted until the electrode 89 of the torch 88 engages the flange 84.

In operation, the housing 10 is first closed around the pipe 22 and the opposite edges of the clamp 14 secured together by the clamping yoke 32 and secured to the pipe 22 by suitable tightening of the set screws 20 against the surface of the pipe. It should be understood, however, that for relatively large pipes, such as for example, a pipe having an outside diameter of five inches, the secondary adaptor split sleeve 24 would not be included but rather only the primary split sleeve 12 would be employed to secure the housing 10 to the relatively large pipe. The C-shaped mounting clamp 66 is thereafter mounted around the flange portion 42b of the split gear assembly and the screws 71 and 72 are tightened into the threaded receptacles 69 and 70 formed in the cutouts 62 and 64, respectively, to thereby secure the clamp 66 against the flange portion of the split gear assembly 42 and prevent the opposite ends of the split gear assembly from separating. The welding torch 88, mounted to the clamp 66, is then adjustably lowered until the electrode 89 of the torch engages the flange 94 press fitted into adjacent ends of the pipes 22 and 92. Thereupon, the motor 54 is actuated, the drive shaft 52 drives the worm gear assembly and the split gear assembly 42 is driven to rotate around the split sleeves 12 and 24. Accordingly, the welding torch 88 rotates around the pipes 22 and 92 and, as it is rotating, welds the two pipes together.

In another embodiment of the invention, as shown in FIGURES 5 and 6, a split gear housing 100 is provided which includes a primary adaptor split sleeve 102 extending through the housing 100 and bolted to one edge of a main split clamp 104 by means of a plurality of selectively spaced bolts 106. The primary adaptor split sleeve 102 includes a plurality of selectively spaced threaded openings 108 formed therein for receiving a plurality of set screws 110. The primary split sleeve 102, along with the set screws 110, is adapted to secure the housing 100 to a relatively large sized pipe 111 extending through the housing. As with the above-described illustrative embodiment of the invention shown in FIGURES 1–4, the primary adaptor split sleeve 102 is adapted to receive a plurality of differently sized secondary adaptor sleeves which, in turn, enable the housing 100 to be secured to smaller sized pipes. In one successful embodiment of the invention, the housing 100 is provided with a primary adaptor split sleeve 102 which is adapted to secure the housing to pipes having an outside diameter of sixteen inches. For smaller sized pipes, such as, for example, pipes having outside diameters between fifteen and one-half and twelve inches, secondary adaptor split sleeves, having dimensions to match these smaller sized pipes, are provided.

Further included within the housing 100 are a pair of clamping yokes 112 and 114 pivotably mounted on opposite upper edges of the main split clamp 104 for securing both pairs of opposite edges of the main split clamp together. As shown, to secure together the upper and lower edges of the main split clamp 104 on the left-hand side of the housing, the yoke 112 is pivoted into a vertical position and a thumb screw 116, secured within the lower lateral edge 118 of the yoke 112, is threaded into a matching threaded receptacle formed in the lower edge or half of the clamp 104. To secure together the upper and lower edges of the main split clamp 104 on the right-hand side of the housing, the yoke 114 is pivoted into a vertical position and a thumb screw 120, secured within the lower lateral edge 122 of the yoke 114 is threaded into a matching threaded receptacle formed in the lower edge or half of the clamp 104.

As with the above-described illustrative embodiment of the invention shown in FIGURES 1–4, there is also provided a bearing guide member 124 attached to the main split clamp 104 by a plurality of selectively spaced bolts 126 for guiding a split gear assembly 128 in its rotational movement around the primary adaptor split sleeve 102. The split gear assembly 128 is shaped such that its gear or tooth portion 128a fits comfortably within a cavity 130 formed in the main body clamp 104 while its skirt or flange portion 128b is shaped to complement the shape of the bearing guide member 124. A pair of dowel assemblies 132 and 134 are further provided in opposite edges of the split gear asembly 128 for accurately aligning both halves of the split gear assembly 128 when the split gear assembly is closed. Further situated within the opening 130 and driven by a motor 136 which is bolted to the main body clamp 104 is a worm gear assembly 138. The worm gear assembly 138 drives the split gear assembly 128 to thereby cause it to rotate around the primary adaptor split sleeve 102. Because of the clamping action to be described hereinbelow, the teeth 140 and 142 of the split and worm gear assemblies 128 and 138, respectively, uniformly mesh.

In order to tightly clamp both pairs of opposite edges of the split gear assembly 128 together and thereby insure uniform meshing between the teeth 140 and 142 of the gear assemblies 128 and 138, respectively, there are provided a pair of welding torch mounting clamps 144 and 146 mounted on opposite sides of the flange portion 128b and in-phase with the plane of the junction between the opposite edges of the split gear assembly 128. The mounting clamps 144 and 146 include upper block members 144a and 146a, respectively, each upper block member having a portion situated within a complementary opening formed in the upper edge of the flange member 128b and a vertical leg portion extending across the plane of the junction between opposite edges of the split gear assembly 128, and lower block members 144b and 146b, respectively, situated within complementary openings formed in opposite sides of the lower edge of the flange member 128b. Threadedly supported within the lower block members 144b and 146b of the mounting clamps are a pair of thumb screws 148 and 150, respectively, which are threaded into matching receptacles formed in the vertical leg portions of the upper block members 144a and 146a.

Accordingly, when it is desired to clamp the opposite edges of the split gear assembly together, the upper and lower block members 144a, 146a and 144b and 146b, respectively, are inserted into their respective matching receptacles formed in the upper and lower edges, respectively, of the flange member 128b of the split gear assembly 128. Thereupon, the thumb screws 148 and 150 are threaded into the matching receptacles formed in the upper block members 144a and 146a until the opposite edges of the split gear assembly 128 are tightly clamped together.

Attached to the upper block member 144a of the welding torch mounting clamp 144 by a pair of bolts 151 and 152 is a generally rectangular support member 154 which supports an L-shaped welding torch bracket 156 in the same manner as described above and illustrated in FIGURES 1 and 2. Moreover, as described above and illustrated in FIGURES 1 and 2, a welding torch 158 is secured within the bracket 156 for welding the pipe 111 to a second pipe (not shown). Accordingly, when the motor 136 is actuated, it will drive the worm gear assembly 138 and the split gear assembly 128 will, in turn, be driven to rotate around the split sleeve 102. The welding torch 158 will similarly rotate around the pipe 111 and the second pipe and, as it is rotating, will weld two pipes together.

It should be understood that the invention is susceptible to considerable modification and not limited to the above-described illustrative embodiments. For example, the welding torch 158, shown in FIGURES 5 and 6, can be secured to the welding torch mounting clamp 146 in the same manner as the torch is secured to the mounting clamp 144. Moreover, if required, welding torches can be mounted on both the mounting clamps 144 and 146. Accordingly, all such modifications and variations within the skill of the art are included within the spirit and intended scope of the invention as defined by the following claims.

I claim:

1. Automatic pipe welding apparatus, comprising a split gear housing having an opening formed therein and a bottom wall extending beyond the side walls of the housing and adapted to secure the housing to a first pipe, a split gear assembly having a tooth portion located within the opening of the housing and a flange portion extending beyond one of the side walls of the housing and in superposed relation with the bottom wall of the housing, a welding torch mounting clamp mounted on the flange portion of the split gear assembly for clamping both halves of the split gear assembly together, a welding torch assembly attached to the mounting clamp and having a welding torch for welding the first pipe to a second pipe and means for driving the tooth portion of the split gear assembly to thereby rotate the welding torch around a junction between the first and second pipes.

2. Apparatus according to claim 1 wherein the means includes a motor driven worm gear assembly located within the opening formed in the split gear housing.

3. Apparatus according to claim 2 wherein the portion of the bottom wall extending beyond one of the side walls includes means for securing a plurality of adaptor sleeves to the bottom wall of the split gear housing to thereby enable the split gear housing to be secured to a plurality of differently sized pipes.

4. Apparatus according to claim 3 further including a pin member for pivotably connecting one pair of opposite edges of the split gear housing together and a yoke for threadedly securing the other pair of opposite edges of the split gear housing together.

5. Apparatus according to claim 4 wherein the flange portion of the split gear assembly includes a pair of cutouts formed on opposite halves of the flange portion and wherein the welding torch mounting clamp comprises a pair of leg members for removable engagement with the cutouts.

6. Apparatus according to claim 5 wherein each of the cutouts includes a threaded receptacle 90° out-of-phase with the plane of the junction between opposite edges of the split gear assembly and wherein each of the leg members includes a threaded screw member for threaded engagement with the receptacles of the cutouts.

7. Apparatus according to claim 6 wherein the split gear housing comprises a main split clamp having an opening formed therein for receiving the tooth portion of the split gear assembly and the worm gear assembly, a first split sleeve member attached to the main split clamp and extending through the housing for securing the housing to the first pipe and a guide bearing member attached to the main split clamp for guiding the split gear assembly in its rotational movement around the first split sleeve member.

8. Automatic pipe welding apparatus, comprising a split gear housing having an opening formed therein and a bottom wall extending beyond the side walls of the housing and adapted to secure the housing to a first pipe, a split gear assembly having a tooth portion located within the opening of the housing and a flange portion extending beyond one of the side walls of the housing and in superposed relation with the bottom wall of the housing, a pair of welding torch mounting clamps mounted on opposite sides of the flange portion of the split gear assembly for clamping both halves of the split gear assembly together, a welding torch assembly attached to at least one of the welding torch mounting clamps and having a welding torch for welding the first pipe to a second pipe and means for driving the tooth portion of the split gear assembly to thereby rotate the welding torch around a junction between the first and second pipe.

9. Apparatus according to claim 8 including a pair of yokes pivotably mounted on opposite sides of the split gear housing for threadedly securing both pairs of opposite edges of the split gear housing together.

10. Apparatus according to claim 9 wherein each of the welding torch mounting clamps includes an upper block member secured to the upper edge of the flange portion of the split gear assembly and extending across the plane of the junction between one pair of opposite edges of the split gear assembly, a lower block member secured to the lower edge of the flange portion of the split gear assembly and a thumb screw supported within the lower block member for threaded engagement with a matching receptacle formed in the upper block member.

References Cited
UNITED STATES PATENTS 2,914,011  11/1959  Morton _____ 228—45

RICHARD H. EANES, JR., *Primary Examiner.*